United States Patent [19]

Brock et al.

[11] Patent Number: 4,528,651
[45] Date of Patent: Jul. 9, 1985

[54] METHOD AND APPARATUS FOR MEASUREMENT OF LENGTH AND HEIGHT OF OBJECTS

[75] Inventors: Gregory K. Brock, Auburn; Bruce R. Knowlen, Tacoma, both of Wash.

[73] Assignee: Weyerhaeuser Company, Tacoma, Wash.

[21] Appl. No.: 463,794

[22] Filed: Feb. 4, 1983

[51] Int. Cl.³ .................. G01S 15/88; G01S 7/52
[52] U.S. Cl. .................. 367/99; 367/96; 367/107; 364/562
[58] Field of Search .......... 367/99, 101, 102, 104, 367/105, 107, 108, 109, 110, 111, 113, 114, 115; 364/471, 478, 560, 561, 562, 563

[56] References Cited

U.S. PATENT DOCUMENTS

| | | | |
|---|---|---|---|
| 3,513,321 | 5/1970 | Sherman | 250/219 |
| 4,206,511 | 6/1980 | Ries et al. | 367/96 |
| 4,271,477 | 6/1981 | Williams | 364/563 |
| 4,332,016 | 5/1982 | Berntsen | 367/103 X |
| 4,356,850 | 11/1982 | Halgrmson et al. | 367/96 X |

Primary Examiner—Richard A. Farley

[57] ABSTRACT

The invention is a method and apparatus for non-contact measurement of the length and height or diameter of geometrically regular objects. The objects enter a first measurement station where horizontally opposed echo ranging transducers make sequential differential measurements to determine the length and transverse position of the object. Position information is sent to a microprocessor. The object is then advanced under a transverse array of downwardly oriented echo ranging transducers. The microprocessor preferably selects the single transducer located most closely to the mid-length position of the object to make a height or diameter measurement. In the case of cylindrical objects, the object should be oriented with its axis parallel to a line projected between the opposed length measuring transducers. As the object is moved by the diameter sensing transducer, the microprocessor selects the measurement indicating the shortest distance between the object and the transducer. Diameter of the object can then be readily determined. The invention is particularly well adapted for measurement of objects that may be randomly located across a moving conveyor system.

20 Claims, 5 Drawing Figures

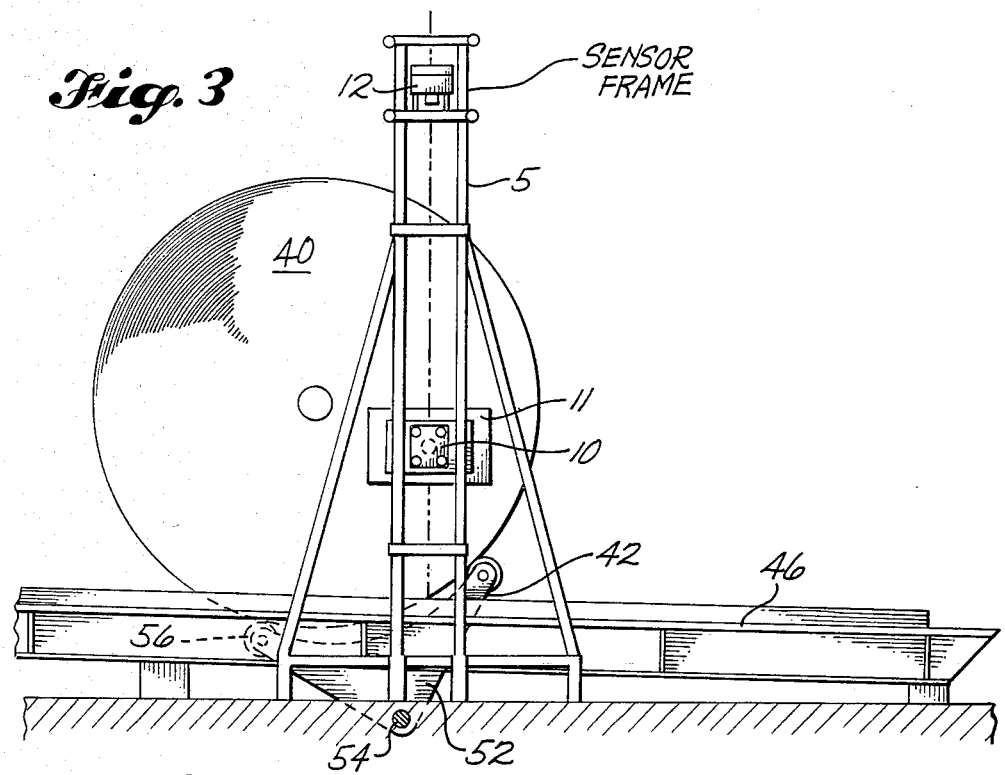
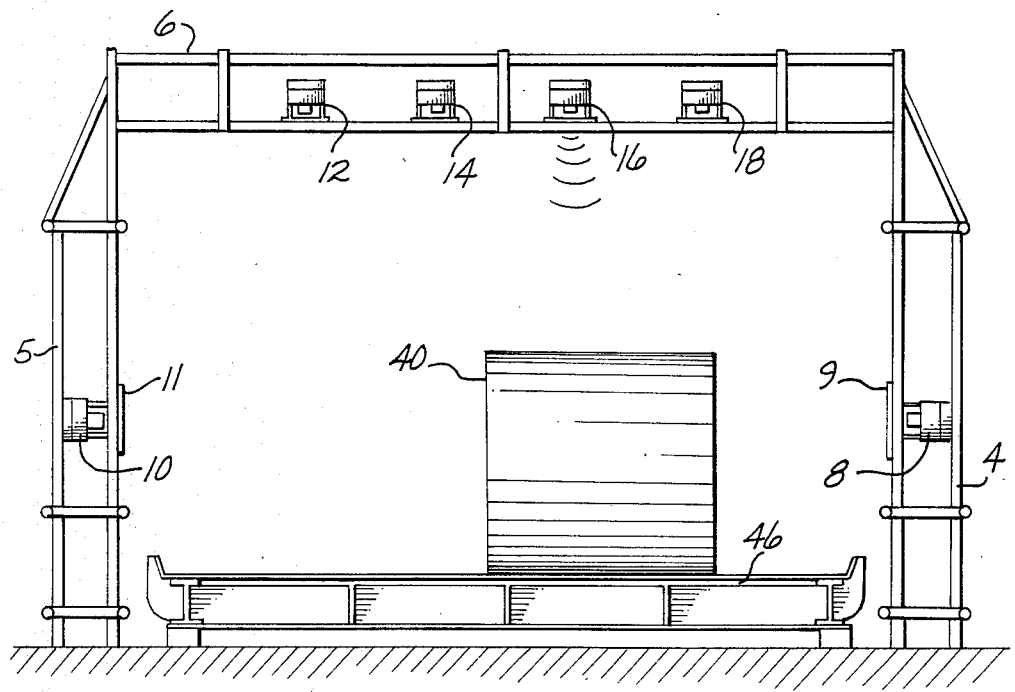

METHOD AND APPARATUS FOR MEASUREMENT OF LENGTH AND HEIGHT OF OBJECTS

The present invention relates to a method and apparatus for measurement of the length and height of geometrically regular objects. It is particularly well adapted for measurement of length and diameter of objects which are generally cylindrical in shape and which may be randomly located in transverse position on an advancing conveyor system.

A number of precise noncontact positioning and scanning instruments are available for measuring physical dimensions of various objects. Many of these are based on the use of linear arrays of photocells and depend upon the fact that the object being measured interrupts some portion of a light beam. Others are based on microwave or ultrasonic transducers which emit a short pulse of radiation and measure the travel time of the pulse to and back from the object. An example of the first type might be found in U.S. Pat. No. 3,513,321 to Sherman. This shows a photocell array used for measuring the minimum diameter of a log moving along a conveyor system. Another noncontact system designed for locating weld seams in pipe utilizes a series of ultrasonic scanners, and is shown in U.S. Pat. No. 4,206,511 to Ries et al. A somewhat different system for measuring dimensions of an object is shown in U.S. Pat. No. 4,271,477 to Williams. This uses two scanning cameras with appropriate image processing means to measure width, length and thickness of geometrically regular objects. Many other similar sensor systems are disclosed in the literature or are available in the marketplace.

All of the systems described above are more than simple sensing and indicating devices. They all use data processing means of some sort, such as a digital computer, microprocessor, or programmable controller to carry out other operations such as averaging measurements, computing volume, or directing some downstream process operating.

All of the above devices, and others known to the present inventors, require the object being measured to be in some predictable and predetermined position as they pass by the sensing transducers. In many industrial operations, this requirement cannot be conveniently met. An example can be readily found within paper mills. Normally, large reels of paper are produced which are approximately the full width of the paper machine. Typically, these are then taken to a slitter, which cuts the large reels into narrower rolls of dimensions which are specified by the customers. The rolls cut from a given reel will often be of different lengths in order to maximize yield and minimize trim wastage at the slitter. In this situation, roll length is the parameter that must usually be carefully controlled while roll diameter will usually vary somewhat, depending both on the customer's preference and on the size of the reels from which the rolls were made.

Rolls produced by a slitter are usually discharged onto a conveyor system for transport to a station where they may be sorted, weighed, and wrapped or otherwise prepared for shipment to a customer. The rolls may be located randomly in regard to transverse position on the conveyor system which moves them from the slitter to the wrapping or packaging operation. Their position on the conveyor can be dependent on their location on their reel from which they were slit. Since these rolls are very heavy, it is a problem to move them from a random transverse position to some predetermined axis of travel. This has posed problems in the design and implementation of automatic equipment which can measure and indicate length and/or diameter.

The present invention describes a method and apparatus which can automatically measure length and height or diameter of geometrically regular objects, such as boxes or rolls, regardless of their transverse position on a conveyor system. This information can then be used in downstream operations, such as wrapping or labelling, or for what other purposes it may be desirable.

SUMMARY OF THE INVENTION

The present invention is a method and apparatus for measuring the length and height or diameter of objects which may be positioned from side to side on a moving conveyor system. While the invention is particularly well adapted for measurement of objects which are generally cylindrical in form it is also suitable for objects having other regular geometric shapes. The only upstream requirement placed on the objects is that they be oriented with a longitudinal axis essentially normal to the direction in which they are being conveyed as they enter the measuring apparatus and that they fall within some predetermined range of measurements, which are those imposed by geometric constraints of the apparatus itself.

In the preferred form of the invention, the object is conveyed to a measuring station where it is positioned between horizontally opposed echo-ranging transducers located on each side of the conveyor system. When in position for measurement, one transducer and then the other will sequentially make measurements indicating the distance from the transducer to the surface of the objects being measured. With the distance between the transducers being a fixed parameter of the system, it is then easy to calculate both the length of the object and its position or location between the two transducers.

It is an important feature of the present invention that in most versions only one transducer at a time is in operation. This prevents interferring signals, which in some situations, can greatly reduce the accuracy of measurements.

After the above measurements are made, at least the transverse position of the object is sent to a microprocessor or other type of calculating element. The object is then advanced through the apparatus under an array of side-by-side ultrasonic transducers, which will normally be oriented vertically downward. The microprocessor selects at least one transducer in the transverse array which has been determined from the position information to be above the object. Normally this will be the single transducer which is closest to the mid-length position of the object. In the case of a cylindrical object, it is desirable that it be moving as it passes the array of transducers. The logic system then selects a measurement which indicates the shortest distance between the transducer and the object. Knowing the distance from the transducer to the base or ramp on which the object is located, it is then an easy matter to calculate the height or diameter of the object. The information thus gained is indicated in some manner and may be used for whatever downstream purpose is desirable.

In some unusual situations, such as the case of a long, generally cylindrical object which may be variable in diameter or somewhat tapered, it may be desirable to utilize two or more diameter-sensing transducers. In this case, whatever logic and/or control mechanism is employed may elect to activate two or more diameter measuring transducers either simultaneously or sequentially. These will usually be the transducers located nearest to the ends of the object. They will thus tend to be relatively far apart and interference problems will be minimized. The information from such a measurement may be either combined and processed to indicate an average diameter or the amount of taper. Alternatively, the measurements may be presented individually.

One embodiment of the invention may include a stop and release means. This is utilized for controlling passage of the objects through the apparatus and for ensuring proper position of the objects relative to the measuring transducers.

It is an object of the present invention to provide a method and apparatus for measuring the length and height or diameter of moving objects which may be randomly positioned across a conveyor system.

It is another object to provide a method and apparatus which will accurately measure the height and diameter of generally cylindrical objects.

It is a further object to provide a method and apparatus which will measure the length and height or diameter of moving objects without any physical contact between the object and the measuring transducers.

These and many other objects will become readily apparent to those skilled in the art upon reading the following detailed description taken in conjunction with the drawings.

BRIEF DESCRIPTION OF THE DRAWINGS

FIG. 3 is a side elevation view of the measuring apparatus.

FIG. 4 is a front elevation view of the measuring apparatus.

DESCRIPTION OF THE PREFERRED EMBODIMENTS

Figure 1:
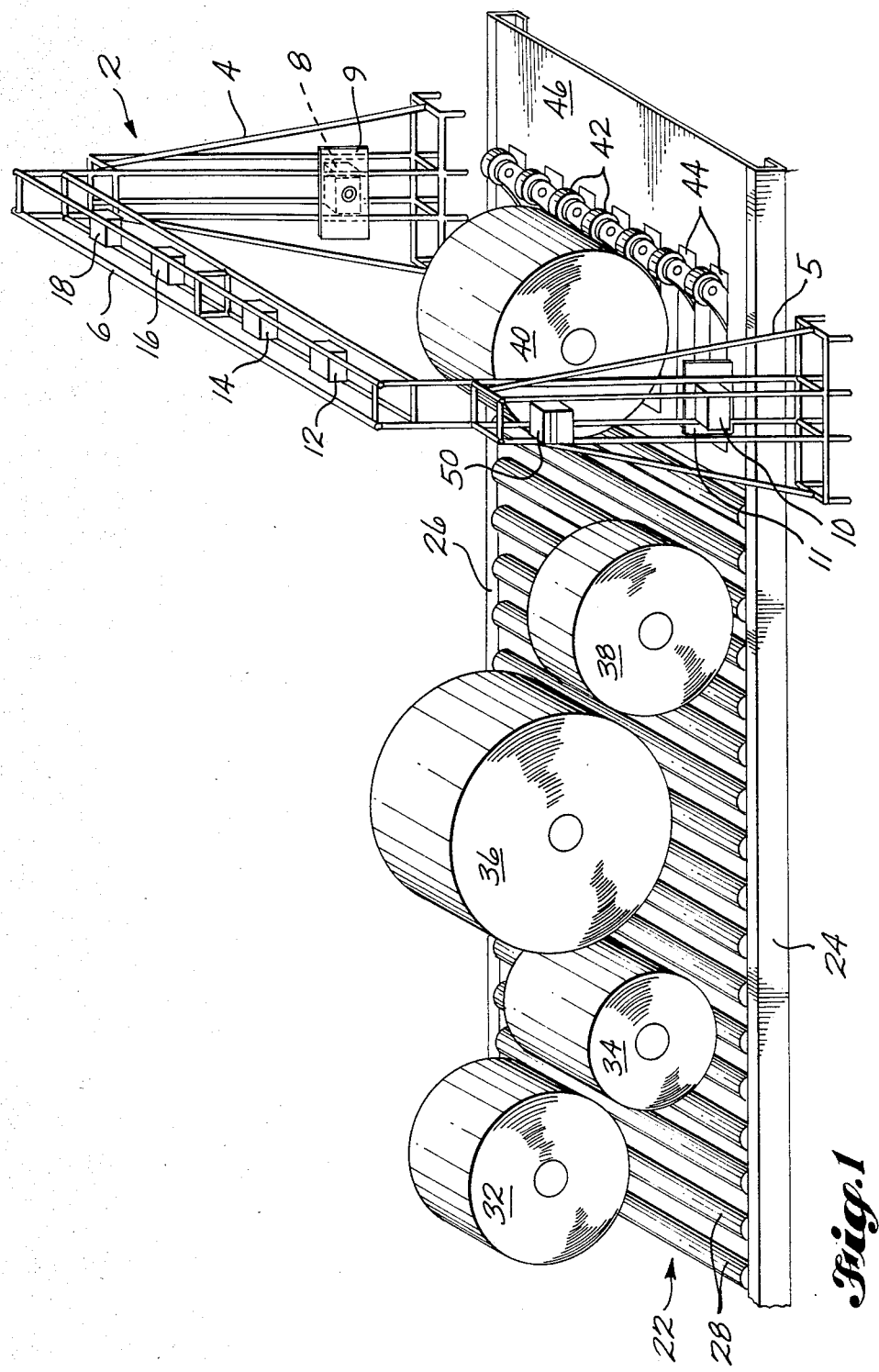
FIG. 1 is a perspective view showing a number of rolls of paper approaching the measuring apparatus on a conveyor line.
Figure 2:
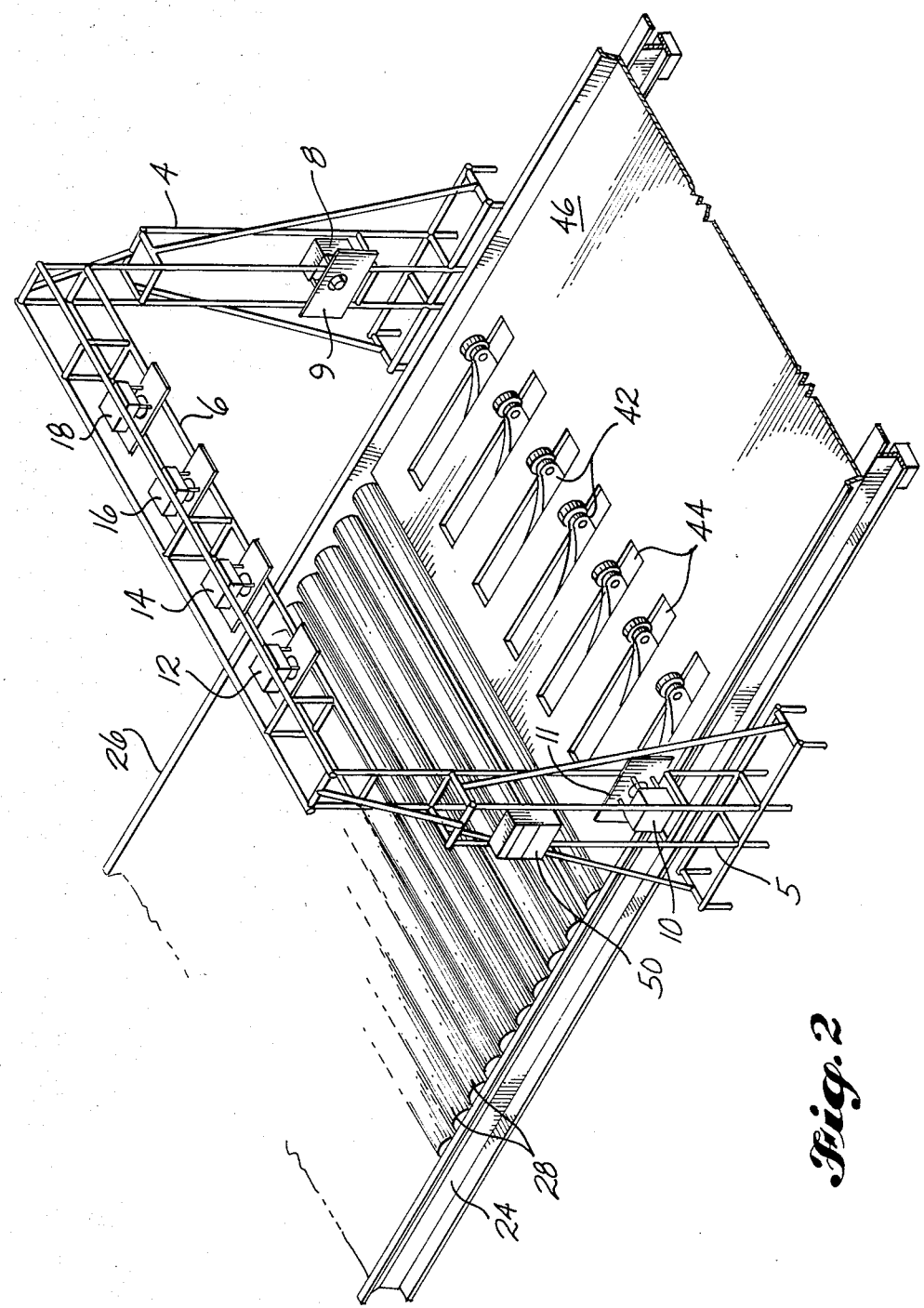
FIG. 2 is a perspective view of the apparatus taken from a position downstream from that of FIG. 1.

The overall operation of the invention can be readily visualized by referring to FIGS. 1 and 2. The measuring apparatus or station 2 comprises a generally inverted U-shaped frame 2. This frame has vertical components 4, 5 which are bridged by a horizontal member 6. Echo-ranging transducers 8,10 are mounted on the vertical frame members, one on each side of the conveyor system. These are oriented so that they project ultrasonic pulses horizontally across the apparatus. Calibration targets 9, 11 are mounted immediately in front of transducers 8, 10. In similar fashion, additional ultrasonic echo-ranging transducers 12, 14, 16, and 18 are mounted along horizontal frame member 6 so that they are arranged transversely across the conveyor line in a relationship essentially normal to the direction of movement. These are oriented so as to project their sound pulses vertically downward. The measuring station 2 is mounted across a roll case, generally indicated at 22.

This comprises side frame members 24, 26 and a series of rolls 28. Some or all of these may be driven rolls in order to move objects along the conveyor system. In the illustraton shown, the roll case is transporting rolls of pulp or paper 32, 34, 36, 38, and 40. It is should be observed that in this illustration the rolls are not only of different length and diameter but are located at different transverse positions on the roll case. This random transverse location has, in the past, posed major problems for the instrumental measurement of length and diameter. The use of rolls as an example should not be considered a limitation since the objects being measured could be rectilinearly shaped or of other geometrically regular configuration. The only limitation is the requirement that essentially parallel planar surfaces must be presented to the length measuring transducers 8, 10. The term "height" should be considered synonymous with "diameter" when the object is cylindrical.

All of the rolls are shown on the conveyor with their longitudinal axes oriented essentially normal to the direction in which they are being conveyed. By putting cylindrically shaped objects into this orientation, the construction of the apparatus is greatly simplified. This also reduces the number of process steps necessary to make the desired measurements. If the objects being measured are rectilinear, such as conventional corrugated shipping containers, it is highly desirable that one axis should be oriented normal to the direction of travel. For a cylindrical object the longitudinal axis is the line projected through and normal to the circular ends. For a rectilinear or other geometrically regular object, the longitudinal axis can be a line parallel to any edge of the object.

Referring to FIGS. 1 and 2, roll 40, which has entered an initial measuring position, is retained by a series of stop/positioning arms 42. These operate through slots 44 cut into a ramp 46 which supports the objects being measured. The ramp surface 46 further serves as a baseline calibration plane for the vertically oriented echo-ranging devices 12, 14, 16, 18. The stop/positioning arms momentarily hold the rolls advancing along the conveyor line until the length measurement is made.

A preferred mode of operation for length measurement of cylindrical objects is seen in FIG. 3. Here roll 40 is seen in position for measurement. Note that the center of the roll is substantially behind or upstream from the position of a line projected between the horizontally oriented transducers 8, 10. In this position, the axis of the roll is also behind the transverse array of transducers 12, 14, 16, 18. The roll is held in length measuring position by arm 42 of a stop/kicker apparatus generally identified in FIG. 3 at 52. This stop/kicker mechanism is pivotally attached to a shaft 54 which can rock the stop/release arms through approximately 30° of arc. In the position shown in FIGS. 1–3, the arms 52 retain the roll for length measurement. After length measurement, the arms 52 rock clockwise and arm portion 56 pushes the roll forward to accelerate it along ramp 46 from which it is again picked up on a conveyor system, not shown. As roll 40 is moved forward by push arm 56, its longitudinal axis passes under the vertically-oriented diameter-measuring sensors and the diameter is determined.

The rolls are shown resting on a platform or ramp 46. This is preferably built so that it is pitched somewhat lower at the discharge end than at the higher end and forms a natural slope. In this way, heavy objects moved forward by push arm 56 are also urged back into forward motion by the action of gravity.

The method of operation of the device will now be described in detail. As was previously noted, it is preferred that the longitudinal axis of a roll should not be advanced into the apparatus so that it lies under the transverse array of transducers when the length measurement is made. The reason for this is as follows. Length measuring transducers 8, 10 will perceive a constant value regardless of the position of roll 40 along ramp 46. However, this is not the case with the diameter-measuring transducers 12, 14, 16, or 18. They will perceive a continually changing value as the roll passes beneath them. It is essential that they indicate the true diameter. This will be measured at the instant the axis of the roll passes under the transducer array. The apparent diameter will be increasing up to that point in time and will thereafter decrease.

The preferred mode of operation is for only a single transducer to be in operation at any one time, regardless of whether length or diameter is being measured. The sequence begins when a sensor, which could be a photocell or other type of presence/absence transducer, indicates that a roll is in position against stop arm 42. In the usual method of operation, the length measuring sensors 8, 10 can also serve as presence/absence indicators. This information is transmitted to a calculating element, such as a microprocessor or programmable controller, which then indicates to transducers 8 and 10 that they should take sequential measurements. The baseline for transducer 8 is the position of transducer 10 and vice versa. These baseline readings can be precisely determined by sequentially echo ranging from calibration targets 9 and 11. Roll length and diameter are both determined by differential echo ranging; i.e., by substraction of the echo distance from the object being measured from the baseline distance. Only when these two sequential length determining measurements have been made and analyzed in the calculating element is the kicker mechanism 52 activated to move the roll forward. At the same time, the calculating element selects a single transducer in the vertically oriented array to make the diameter measurement. This transducer is the one that will be closest to the mid-line of the roll. For example, in FIG. 4, roll 40 is within the measuring field of transducers 16 and 18. However, only transducer 16 will normally be activated in order to prevent interference. In the case of very long objects, which might be of variable diameter or of tapered form, it might be desirable to operate more than one of the diameter measuring transducers simultaneously. In this case, two transducers may be operated, which would normally be the two closest to the ends of the object.

Figure 5:
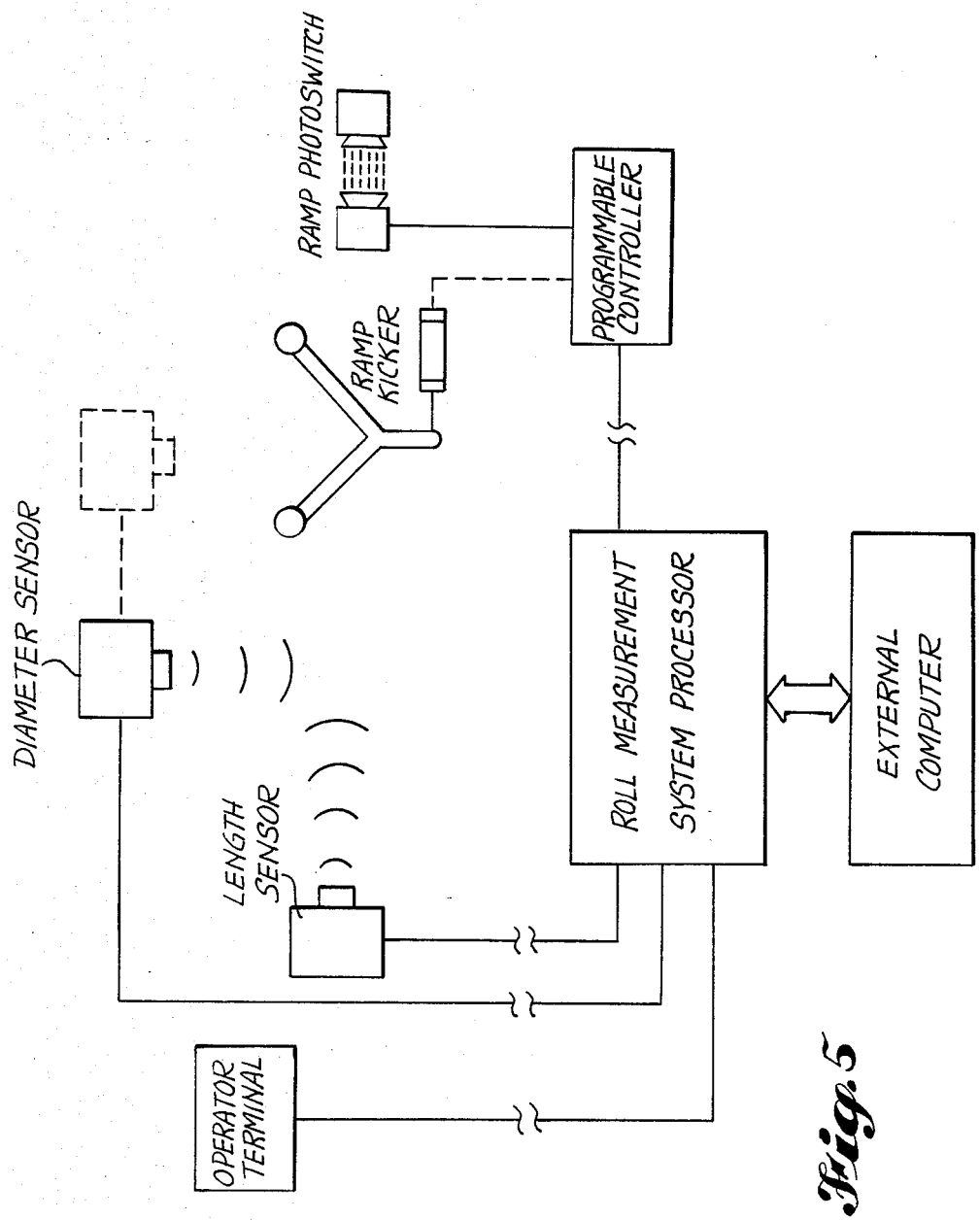
FIG. 5 is a block diagram showing how the various components of the apparatus are interconnected.

FIG. 5 is a typical block diagram showing how the control system for the apparatus might be constructed. The process begins when a roll enters the domain of the length sensors. These operate through a programmable controller and the roll measurement system processor. The system processor sequentially activates the length measuring transducers and signals the kicker to advance the roll under the diameter measuring transducers. The system processor is designated to select and record the shortest distance it observes between the transducer and the passing roll so that a true diameter measurement is indicated. The system may be linked to an operator terminal to indicate length and diameter of rolls which pass through the system and/or it may optionally be tied to an external computer. A ramp photoswitch or other suitable presence/absence sensor indicates when an object has cleared the system and it is then reset to take another measurement.

It should be understood that in the art today, the terms programmable controller, microprocessor, microcomputer, etc. are in large part overlapping in meaning and interchangeable. In the context used here, they apply to any type of calculating element, which could be analog, digital, or otherwise, which is capable of performing the operations described.

The echo ranging transducers and their associated timing and measurement circuitry may be chosen from any of a number of types readily available in the marketplace. One type that has worked well is available from Polaroid Corporation, Cambridge, Mass. as the Polaroid Ultrasonic Ranging Unit. This emits a complex series of pulses at four frequencies between 50 and 60 kHz. By using this complex pulse form, more reliable echos are obtained from surfaces that tend to absorb single frequencies. It may be desirable to combine the transducers with sound directing ducts as shown in U.S. Pat. No. 4,101,865 to Schurr.

An alternative form of apparatus which would obviate the need for sequential operation of the transducers might be one in which each transducer operated on a different frequency. This raises the expense and complexity of the system since signal processing systems would have to be very sharply filtered to eliminate interference. Another variation might employ laser ranging systems as length and height or diameter sensors.

It will be evident to those skilled in the art that many variations will be possible in the method and apparatus which has just been described. It is the intent of the inventors that these equivalent structures and method steps are to be considered limited only as described by the following claims:

What is claimed is:

1. A method of measuring the length and height or diameter of a geometrically regular object randomly positioned from side to side on a moving conveyor system which comprises
  a. orienting the object so that it is positioned with its longitudinal axis normal to the direction in which it is being conveyed;
  b. conveying the object to a measuring station between opposed echo-ranging transducers located on each side of the conveyor system;
  c. determining the length of the object and its transverse position on the conveyor system by differential echo-ranging;
  d. sending at least the transverse position to a microprocessor;
  e. advancing the object beneath a transverse array of diameter sensing echo-ranging transducers;
  f. activating the transducer in the aray which is closest to the mid-length position of the object to measure the height or diameter by echo-ranging, said transducer being selected by the microprocessor on the basis of transverse position location; and
  g. indicating the length and diameter of the object.

2. The method of claim 1 which further comprises momentarily stopping the object while determining length and position.

3. The method of claim 2 in which the object is stopped before its center reaches a line projected between the length measuring transducers.

4. The method of claim 3 which further comprises stopping the object on a downwardly sloping ramp.

5. The method of claim 4 which further comprises releasing the object after the length and transverse position measurements have been made so that its movement down the ramp is assisted by gravity.

6. The method of claim 1 in which the object is moving as it passes the height or diameter sensing transducers.

7. The method of claim 6 in which only the minimum distance between the object and height or diameter sensing transducers is indicated.

8. A method of measuring the length and diameter of a generally cylindrical object which comprises:
   a. orienting the object so that it is positioned on its side with its longitudinal axis normal to the direction in which it will be conveyed;
   b. conveying the object to a measuring station located between horizontally opposed echo-ranging transducers;
   c. determining the length of the object and its position between the transducers by differential echo-ranging;
   d. sending the length and position information to a microprocessor;
   e. advancing the object beneath a transverse array of diameter sensing echo-ranging transducers;
   f. selecting at least one transducer in the transverse array which has been determined by the microprocessor to be above the object from the position information;
   g. activating the selected transducer or transducers to sense diameter of the object by echo-ranging as the object passes; and
   h. indicating the length and diameter of the object;

9. The method of claim 8 in which a single diameter measuring transducer is selected, said transducer being located nearest to the mid-length position of the object being measured.

10. The method of claim 8 in which two diameter measuring transducers on selected, said transducers being located nearest to the end positions of the object being measured.

11. The method of claim 10 which further comprises averaging the diameter measurements.

12. The method of claim 10 which further comprises indicating each diameter measurement separately.

13. Apparatus for measuring the length and height of objects which comprises;
   a. a supporting frame for position sensing transducers;
   b. a ramp means associated with the frame on which the object being measured is supported;
   c. a pair of opposed, horizontally oriented, echo-ranging transducers mounted on the frame to form a measuring station so as to sense the length and position of an object randomly located but oriented transversely lengthwise between the transducers;
   d. an array of side-by-side echo-ranging transducers supported by the frame and oriented vertically downward so as to measure the height of the object;
   e. microprocessor means for receiving object position data from the horizontally oriented transducers and processing the position information so as to select and activate only the single vertically oriented transducer most closely located to the mid-length position of the object; and
   f. means for indicating the length and height of the objects.

14. The apparatus of claim 13 in which the ramp is adapted to serve as an echo-ranging reference point for height measurement.

15. The apparatus of claim 13 which further includes a stop and release means for controlling passage of the objects along the ramp and the position of the objects relative to the transducers.

16. The apparatus of claim 13 in which the ramp is downwardly sloping in a direction of travel of the objects so that the objects are moved with a gravity assist.

17. The apparatus of claim 15 which is particularly adapted for measurement of generally cylindrical objects and in which the stop and release means is positioned to stop an incoming object prior to the point at which its longitudinal axis reaches the measuring station.

18. The apparatus of claim 17 in which the stop and release means serves to move the object forward on command from the microprocessor after a length and position measurement has been made in order that a height or diameter measurement may then be made.

19. The apparatus of claim 18 in which the ramp is downwardly sloping in a direction of travel of the objects so that the objects are moved with a gravity assist.

20. The apparatus of claim 13 which further includes target means to serve as an echo ranging reference point for calibration of the horizontally oriented transducers.

* * * * *